G. V. FELLOWS.
SHAPER HEAD.
APPLICATION FILED FEB. 11, 1909.
938,135.
Patented Oct. 26, 1909.
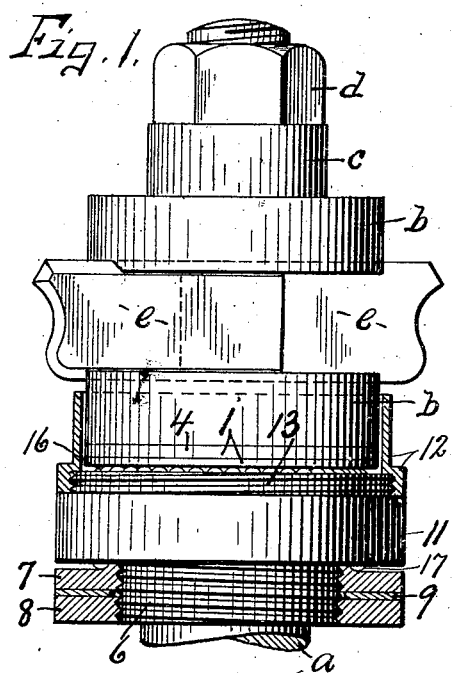
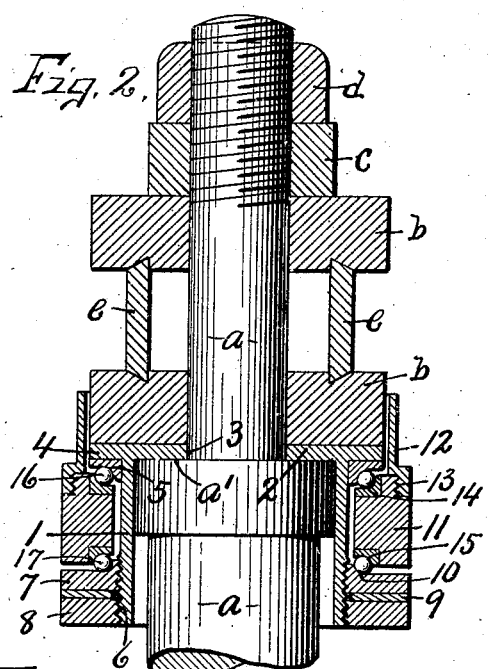
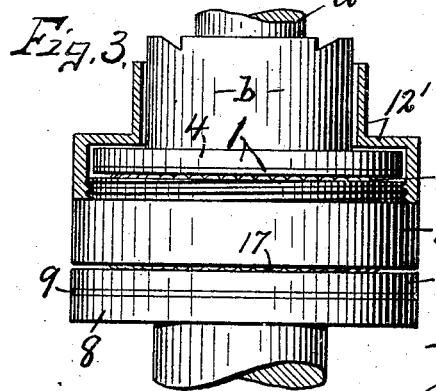
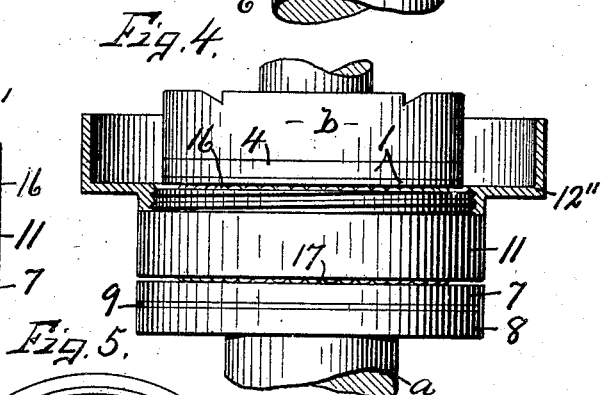
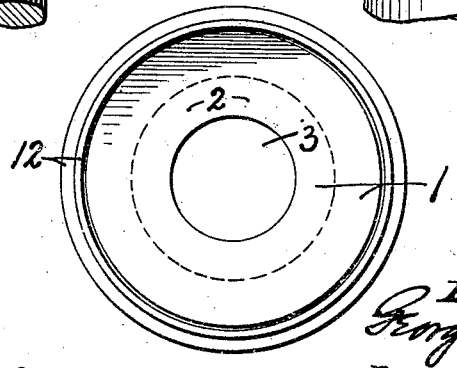
Witnesses.
Inventor.
George V. Fellows
By.
Howard P. Denison
Attorney.

UNITED STATES PATENT OFFICE.

GEORGE V. FELLOWS, OF SYRACUSE, NEW YORK.

SHAPER-HEAD.

938,135.

Specification of Letters Patent. Patented Oct. 26, 1909.

Application filed February 11, 1909. Serial No. 477,442.

*To all whom it may concern:*

Be it known that I, GEORGE V. FELLOWS, of Syracuse, in the county of Onondaga, in the State of New York, have invented new and useful Improvements in Shaper-Heads, of which the following, taken in connection with the accompanying drawings, is a full, clear, and exact description.

This invention relates to certain improvements in shaper heads adapted to be used in connection with the spindle and usual knife clamping collars of any shaper head to afford an annular bearing for the pattern upon which the wood-work to be shaped is mounted.

The main object is to reduce friction between the shaper head and pattern, and to enable the pattern with the work thereon to be operated against the cutting knives of the shaper head with a minimum degree of resistance and wear upon the pattern and portion of the shaper head with which it contacts. In addition to this object I have sought to provide the head with a loose but co-axial collar adapted to be held against rotation, or rotated independently of the shaper head by contact with the pattern, and at the same time to enable such collar to be used in connection with any of the shaper heads now in use in which the cutting knives are held or clamped between clamping collars by means of a nut on the spindle without any special re-fitting of the spindle or clamping collars. These spindles are usually provided with reduced upper ends upon which the knife clamping collars are mounted, leaving a shoulder against which the lower collar rests, and in my present invention I have made use of this construction of spindle by mounting a loose annular collar upon an inner sleeve having an apertured top fitted over the reduced end of the spindle and resting against the shoulder formed thereby, thus forming a seat for the lower knife clamping collar so that the same mechanism used for clamping the knives and collars to the spindle also clamps the sleeve to the spindle to rotate therewith, while the loose collar which forms the bearing for the pattern is revolubly mounted upon the sleeve to rotate independently thereof, or to be held against rotation by contact with the pattern.

Other objects and uses relating to specific parts of the shaper head will be brought out in the following description.

In the drawings:—Figure 1 is a side elevation partly in section of a shaper head embodying the various features of my invention. Fig. 2 is a transverse vertical sectional view through the same head showing the spindle in elevation. Figs. 3 and 4 are elevations of the lower portions of the same head, showing different sizes of annular bearings for the pattern. Fig. 5 is a top plan of the detached collar and its supporting sleeve, seen in Figs. 1 and 2.

In carrying out the object stated, I employ the usual shaper spindle —a—, knife clamping collars —b— and sleeve —c— and clamping nut —d—, the upper end of the spindle being reduced to form an annular shoulder or bearing —a'— at its junction with the lower larger portion.

The collars —b— are provided in their adjacent faces with V shaped grooves for receiving and retaining suitable knives, as —e—, said collars being loosely fitted with an easily sliding and rotary fit upon the reduced upper end of the spindle —a—, and together with the knives —e— and sleeve —c— are usually clamped between the shoulder —a'— and nut —d—, the latter engaging the upper threaded end of the reduced end of the spindle, as clearly shown in Fig. 2.

In my present invention, however, I employ a sleeve —1— co-axial with and surrounding a portion of the spindle below the shoulder —a'— and having a substantially flat top or web —2— which is formed with a central aperture —3— fitting with an easy sliding fit upon the reduced portion of the spindle with the web —2— resting upon the shoulder —a'—.

The upper end of the sleeve —1— is provided with a laterally projecting annular flange —4— having on its under side an annular ball race —5—.

The lower end of the sleeve —1— is threaded externally, preferably with a left hand thread —6—, upon which is screwed a bearing ring —7— and a lock nut —8— with a suitable interposed washer —9—.

The bearing ring —7— is provided with an annular ball race —10— which, in this instance, is directly under, but some distance below, the ball race —5— of the flange —4— for receiving a loose collar composed of sections —11— and —12—. These sections are secured together end to end, preferably by right hand screw threads —13—, the lower section being interposed between the ball races —5— and —10— and is provided with similar ball races —14— and —15— for receiving upper and lower sets of anti-friction balls —16— and —17—, as clearly shown in Fig. 2.

It is now clear that the loose collar comprising the section —11— and —12— is revolubly mounted upon the sleeve —1— between the bearings —5— and —10—, coaxial with the spindle —a— and surrounding said sleeve, and with the ring —7— may be adjusted to take up any wear of the anti-friction bearings between the collar and sleeve, while the lock nut —8— serves to retain the ring —7— in its adjusted position.

The collar section —12— forms an annular bearing for the pattern upon which the wood-work to be shaped is mounted, and may be of any diameter to conform to different sizes of collars used for different classes of work. For example, in Fig. 3 I have shown a collar section —12′— as provided with a reduced bearing, while in Fig. —4— I have shown a similar or larger collar section —12″—. In each case, however, it will be observed that the collar sections —12—, —12′— and —12″— are detachably screwed upon the upper end of the collar section —11— and, therefore, it is only necessary to carry in stock various sizes of the collar sections —12—, the other parts remaining the same under all conditions.

The collar section —12— extends some distance above the collar section —11— and also some distance above the upper end of the sleeve —1— and is of sufficient interior diameter to receive the lower clamping collar —b—, leaving ample clearance at the sides to prevent friction between the collar section —12— and clamping collar —b—, a similar clearance being left at the edges of the lateral annular flange —4— of the sleeve —1—.

It is now evident that the operation of clamping the knives —e— in place between the collars —b— also serves to firmly but frictionally clamp the sleeve —1— between the lower clamping collar —b— and shoulder —a′— of the spindle —a— thereby frictionally locking the sleeve —1— to the spindle to rotate therewith. It is also evident that when the pattern is brought against the annular bearing face of the collar section —12— this collar section, together with the collar section —11— which are loose on the sleeve —1—, will be held against rotation, or rather will roll in the reverse direction as the pattern with the work thereon is moved in the direction opposed to the rotation of the knives and actuating spindle —a—, although when the pattern is removed the loose collar is free to rotate with the spindle and parts secured thereto. These shaper spindles with the heads thereon are adapted to be raised and lowered to adjust the knives relatively to the work, and, therefore, the portions of the clamping head below the annular bearing face of the collar section —12— may be brought below the surface of the table upon which the pattern with the work thereon is adapted to rest.

What I claim is—

1. In combination with a shaper spindle having a reduced threaded end forming a shoulder on the spindle, knife clamping collars on the reduced portion of the spindle, knives clamped between said collars, means for forcing the collars toward each other to clamp the knives between them, a sleeve having a portion thereof interposed between the shoulder on the spindle and adjacent knife clamping collar and frictionally clamped between said shoulder and adjacent collar by the same clamping means which clamps the collars upon the knives, and an additional collar loosely journaled upon the sleeve and having an annular bearing for a pattern.

2. In a shaper head in combination with a spindle, a sleeve rotating with the spindle, and a collar journaled on the sleeve and provided with a removable annular bearing section screwed thereto.

3. In combination with a shaper spindle, a sleeve and means for frictionally clamping the sleeve to the spindle to rotate therewith, said sleeve having one end with a laterally projecting annular flange and its other end provided with screw threads, a bearing ring screwed upon said threads, a collar journaled between said flange and ring and rotatable independently of the sleeve, said collar being provided with a removable bearing section screwed thereto.

4. In combination with a shaper spindle, a sleeve clamped to said spindle to rotate therewith and provided with ball races some distance apart, one above the other, a collar section surrounding said sleeve and having portions thereof interposed between said ball races, said collar section being provided with annular bearings, anti-friction bearings between said bearings and ball races, and an additional collar section screwed upon the first named collar section and provided with an annular bearing face.

5. In combination with a shaper spindle, a sleeve encircling and clamped upon said spindle to rotate therewith, said sleeve having an annular ball race at one end and its opposite end threaded, a ring screwed upon the threaded end of the sleeve, a lock nut also screwed upon the threaded end of the sleeve to hold said ring in place, a collar section surrounding the sleeve between said ball race and ring, a set of anti-friction balls between the ball race and adjacent end of the collar section, an additional set of anti-friction balls between the ring and adjacent end of the collar section, and an additional collar section screwed upon one end of the first named collar section, the screw threads upon the sleeve being of one pitch and the screw threads between the collar sections being of opposite pitch.

In witness whereof I have hereunto set my hand this 5th day of February 1909.

GEORGE V. FELLOWS.

Witnesses:
H. E. CHASE,
ZOE MILLER.